United States Patent
Eliaz et al.

(10) Patent No.: US 8,891,701 B1
(45) Date of Patent: Nov. 18, 2014

(54) NONLINEARITY COMPENSATION FOR RECEPTION OF OFDM SIGNALS

(71) Applicant: MagnaCom Ltd., Moshav Ben Shemen (IL)

(72) Inventors: Amir Eliaz, Moshav Ben Shemen (IL); Ilan Reuven, Ganey Tikva (IL)

(73) Assignee: MagnaCom Ltd. (IL)

( * ) Notice: Subject to any disclaimer, the term of this patent is extended or adjusted under 35 U.S.C. 154(b) by 0 days.

(21) Appl. No.: 14/298,373

(22) Filed: Jun. 6, 2014

(51) Int. Cl.
*H03D 1/04* (2006.01)
*H04L 27/26* (2006.01)
*H04B 1/10* (2006.01)

(52) U.S. Cl.
CPC .............. *H04L 27/2647* (2013.01); *H04B 1/10* (2013.01)
USPC ..... 375/346; 455/114.2; 455/266; 455/67.13; 455/296

(58) Field of Classification Search
CPC ...................... H04L 27/2647; H04L 25/03057; H04L 25/067; H03F 1/3247
See application file for complete search history.

(56) References Cited

U.S. PATENT DOCUMENTS

| | | |
|---|---|---|
| 4,109,101 A | 8/1978 | Mitani |
| 4,135,057 A | 1/1979 | Bayless, Sr. et al. |
| 4,797,925 A | 1/1989 | Lin |
| 5,111,484 A | 5/1992 | Karabinis |
| 5,131,011 A | 7/1992 | Bergmans et al. |
| 5,202,903 A | 4/1993 | Okanoue |
| 5,249,200 A | 9/1993 | Chen et al. |
| 5,283,813 A | 2/1994 | Shalvi et al. |
| 5,291,516 A | 3/1994 | Dixon et al. |
| 5,394,439 A | 2/1995 | Hemmati |
| 5,459,762 A | 10/1995 | Wang et al. |
| 5,590,121 A | 12/1996 | Geigel et al. |
| 5,602,507 A | 2/1997 | Suzuki |
| 5,757,855 A | 5/1998 | Strolle et al. |
| 5,784,415 A | 7/1998 | Chevillat et al. |
| 5,818,653 A | 10/1998 | Park et al. |
| 5,886,748 A | 3/1999 | Lee |
| 5,889,823 A | 3/1999 | Agazzi et al. |
| 5,915,213 A | 6/1999 | Iwatsuki et al. |
| 5,930,309 A | 7/1999 | Knutson et al. |
| 6,009,120 A | 12/1999 | Nobakht |

(Continued)

OTHER PUBLICATIONS

Equalization: The Correction and Analysis of Degraded Signals, White Paper, Agilent Technologies, Ransom Stephens V1.0, Aug. 15, 2005 (12 pages).

(Continued)

*Primary Examiner* — Leon-Viet Nguyen
(74) *Attorney, Agent, or Firm* — McAndrews, Held & Malloy, Ltd.

(57) ABSTRACT

An electronic receiver may comprise nonlinear distortion modeling circuitry, interference estimation circuitry, and sequence estimation circuitry. The receiver may receive an orthogonal frequency division multiplexing (OFDM) symbol in the form of an electromagnetic signal. The nonlinear distortion modeling circuitry may generate a nonlinear distortion model that models nonlinear distortion introduced to the received electromagnetic signal en route to the sequence estimation circuitry. The interference estimation circuitry may estimate inter-subcarrier interference present in the received OFDM symbol based on the generated nonlinear distortion model. The estimating of the inter-subcarrier interference may comprise applying the nonlinear distortion model to one or more candidate vectors generated by the sequence estimation circuitry. The sequence estimation circuitry may sequentially process a plurality of received virtual subcarrier values of the OFDM symbol using the estimated inter-subcarrier interference.

25 Claims, 6 Drawing Sheets

(56) References Cited

U.S. PATENT DOCUMENTS

| | | | |
|---|---|---|---|
| 6,167,079 | A | 12/2000 | Kinnunen et al. |
| 6,233,709 | B1 | 5/2001 | Zhang et al. |
| 6,272,173 | B1 | 8/2001 | Hatamian |
| 6,335,954 | B1 | 1/2002 | Bottomley et al. |
| 6,516,437 | B1 | 2/2003 | Van Stralen et al. |
| 6,532,256 | B2 | 3/2003 | Miller |
| 6,535,549 | B1 | 3/2003 | Scott et al. |
| 6,697,441 | B1 | 2/2004 | Bottomley et al. |
| 6,785,342 | B1 | 8/2004 | Isaksen et al. |
| 6,871,208 | B1 | 3/2005 | Guo et al. |
| 6,968,021 | B1 | 11/2005 | White et al. |
| 6,985,709 | B2 * | 1/2006 | Perets .......................... 455/266 |
| 7,158,324 | B2 | 1/2007 | Stein et al. |
| 7,190,288 | B2 | 3/2007 | Robinson et al. |
| 7,205,798 | B1 | 4/2007 | Agarwal et al. |
| 7,206,363 | B2 | 4/2007 | Hegde et al. |
| 7,215,716 | B1 | 5/2007 | Smith |
| 7,467,338 | B2 | 12/2008 | Saul |
| 7,830,854 | B1 | 11/2010 | Sarkar et al. |
| 7,974,230 | B1 | 7/2011 | Talley et al. |
| 8,005,170 | B2 | 8/2011 | Lee et al. |
| 8,059,737 | B2 | 11/2011 | Yang |
| 8,175,186 | B1 | 5/2012 | Wiss et al. |
| 8,199,804 | B1 | 6/2012 | Cheong |
| 8,248,975 | B2 | 8/2012 | Fujita et al. |
| 8,351,536 | B2 | 1/2013 | Mazet et al. |
| 8,422,589 | B2 | 4/2013 | Golitschek Edler Von Elbwart et al. |
| 8,526,523 | B1 | 9/2013 | Eliaz |
| 8,548,072 | B1 | 10/2013 | Eliaz |
| 8,548,089 | B2 | 10/2013 | Agazzi et al. |
| 8,548,097 | B1 | 10/2013 | Eliaz |
| 8,553,821 | B1 | 10/2013 | Eliaz |
| 8,559,494 | B1 | 10/2013 | Eliaz |
| 8,559,496 | B1 | 10/2013 | Eliaz |
| 8,559,498 | B1 | 10/2013 | Eliaz |
| 8,565,363 | B1 | 10/2013 | Eliaz |
| 8,566,687 | B1 | 10/2013 | Eliaz |
| 8,571,131 | B1 | 10/2013 | Eliaz |
| 8,571,146 | B1 | 10/2013 | Eliaz |
| 8,572,458 | B1 | 10/2013 | Eliaz |
| 8,582,637 | B1 | 11/2013 | Eliaz |
| 8,599,914 | B1 | 12/2013 | Eliaz |
| 8,605,832 | B1 | 12/2013 | Eliaz |
| 8,665,941 | B1 | 3/2014 | Eliaz |
| 8,665,992 | B1 | 3/2014 | Eliaz |
| 8,666,000 | B2 | 3/2014 | Eliaz |
| 8,675,769 | B1 | 3/2014 | Eliaz |
| 8,675,782 | B2 | 3/2014 | Eliaz |
| 8,681,889 | B2 | 3/2014 | Eliaz |
| 8,744,003 | B2 | 6/2014 | Eliaz |
| 2001/0008542 | A1 | 7/2001 | Wiebke et al. |
| 2002/0016938 | A1 | 2/2002 | Starr |
| 2002/0123318 | A1 | 9/2002 | Lagarrigue |
| 2002/0150065 | A1 | 10/2002 | Ponnekanti |
| 2002/0150184 | A1 | 10/2002 | Hafeez et al. |
| 2002/0172297 | A1 | 11/2002 | Ouchi et al. |
| 2003/0016741 | A1 | 1/2003 | Sasson et al. |
| 2003/0135809 | A1 | 7/2003 | Kim |
| 2003/0210352 | A1 | 11/2003 | Fitzsimmons et al. |
| 2004/0037374 | A1 | 2/2004 | Gonikberg |
| 2004/0120409 | A1 | 6/2004 | Yasotharan et al. |
| 2004/0142666 | A1 | 7/2004 | Creigh et al. |
| 2004/0170228 | A1 | 9/2004 | Vadde |
| 2004/0174937 | A1 | 9/2004 | Ungerboeck |
| 2004/0203458 | A1 * | 10/2004 | Nigra .......................... 455/67.13 |
| 2004/0227570 | A1 | 11/2004 | Jackson et al. |
| 2004/0240578 | A1 | 12/2004 | Thesling |
| 2005/0047517 | A1 | 3/2005 | Georgios et al. |
| 2005/0135472 | A1 | 6/2005 | Higashino |
| 2005/0220218 | A1 | 10/2005 | Jensen et al. |
| 2005/0265470 | A1 | 12/2005 | Kishigami et al. |
| 2005/0276317 | A1 | 12/2005 | Jeong et al. |
| 2006/0067396 | A1 | 3/2006 | Christensen |
| 2006/0109780 | A1 | 5/2006 | Fechtel |
| 2006/0171489 | A1 | 8/2006 | Ghosh et al. |
| 2006/0239339 | A1 | 10/2006 | Brown et al. |
| 2006/0245765 | A1 | 11/2006 | Elahmadi et al. |
| 2006/0280113 | A1 | 12/2006 | Huo |
| 2007/0092017 | A1 | 4/2007 | Abedi |
| 2007/0098090 | A1 | 5/2007 | Ma et al. |
| 2007/0098116 | A1 | 5/2007 | Kim et al. |
| 2007/0110177 | A1 | 5/2007 | Molander et al. |
| 2007/0110191 | A1 | 5/2007 | Kim et al. |
| 2007/0127608 | A1 | 6/2007 | Scheim et al. |
| 2007/0140330 | A1 | 6/2007 | Allpress et al. |
| 2007/0189404 | A1 | 8/2007 | Baum et al. |
| 2007/0213087 | A1 | 9/2007 | Laroia et al. |
| 2007/0230593 | A1 | 10/2007 | Eliaz et al. |
| 2007/0258517 | A1 | 11/2007 | Rollings et al. |
| 2007/0291719 | A1 | 12/2007 | Demirhan et al. |
| 2008/0002789 | A1 | 1/2008 | Jao et al. |
| 2008/0049598 | A1 | 2/2008 | Ma et al. |
| 2008/0080644 | A1 | 4/2008 | Batruni |
| 2008/0130716 | A1 | 6/2008 | Cho et al. |
| 2008/0130788 | A1 | 6/2008 | Copeland |
| 2008/0159377 | A1 | 7/2008 | Allpress et al. |
| 2008/0207143 | A1 | 8/2008 | Skarby et al. |
| 2008/0260985 | A1 | 10/2008 | Shirai et al. |
| 2009/0003425 | A1 | 1/2009 | Shen et al. |
| 2009/0028234 | A1 | 1/2009 | Zhu |
| 2009/0075590 | A1 | 3/2009 | Sahinoglu et al. |
| 2009/0086808 | A1 | 4/2009 | Liu et al. |
| 2009/0122854 | A1 | 5/2009 | Zhu et al. |
| 2009/0185612 | A1 | 7/2009 | McKown |
| 2009/0213908 | A1 | 8/2009 | Bottomley |
| 2009/0290620 | A1 | 11/2009 | Tzannes et al. |
| 2009/0323841 | A1 | 12/2009 | Clerckx et al. |
| 2010/0002692 | A1 | 1/2010 | Bims |
| 2010/0034253 | A1 | 2/2010 | Cohen |
| 2010/0039100 | A1 | 2/2010 | Sun et al. |
| 2010/0062705 | A1 | 3/2010 | Rajkotia et al. |
| 2010/0074349 | A1 | 3/2010 | Hyllander et al. |
| 2010/0166050 | A1 | 7/2010 | Aue |
| 2010/0172309 | A1 | 7/2010 | Forenza et al. |
| 2010/0202505 | A1 | 8/2010 | Yu et al. |
| 2010/0202507 | A1 | 8/2010 | Allpress et al. |
| 2010/0208774 | A1 | 8/2010 | Guess et al. |
| 2010/0215107 | A1 | 8/2010 | Yang |
| 2010/0220825 | A1 | 9/2010 | Dubuc et al. |
| 2010/0278288 | A1 | 11/2010 | Panicker et al. |
| 2010/0284481 | A1 | 11/2010 | Murakami et al. |
| 2010/0309796 | A1 | 12/2010 | Khayrallah |
| 2010/0329325 | A1 | 12/2010 | Mobin et al. |
| 2011/0051864 | A1 | 3/2011 | Chalia et al. |
| 2011/0064171 | A1 | 3/2011 | Huang et al. |
| 2011/0074500 | A1 | 3/2011 | Bouillet et al. |
| 2011/0074506 | A1 | 3/2011 | Kleider et al. |
| 2011/0090986 | A1 | 4/2011 | Kwon et al. |
| 2011/0134899 | A1 | 6/2011 | Jones, IV et al. |
| 2011/0150064 | A1 | 6/2011 | Kim et al. |
| 2011/0164492 | A1 | 7/2011 | Ma et al. |
| 2011/0188550 | A1 | 8/2011 | Wajcer et al. |
| 2011/0228869 | A1 | 9/2011 | Barsoum et al. |
| 2011/0243266 | A1 | 10/2011 | Roh |
| 2011/0275338 | A1 | 11/2011 | Seshadri et al. |
| 2011/0310823 | A1 | 12/2011 | Nam et al. |
| 2011/0310978 | A1 | 12/2011 | Wu et al. |
| 2012/0051464 | A1 | 3/2012 | Kamuf et al. |
| 2012/0106617 | A1 | 5/2012 | Jao et al. |
| 2012/0207248 | A1 | 8/2012 | Ahmed et al. |
| 2013/0028299 | A1 | 1/2013 | Tsai |
| 2013/0044877 | A1 | 2/2013 | Liu et al. |
| 2013/0121257 | A1 | 5/2013 | He et al. |

OTHER PUBLICATIONS

Modulation and Coding for Linear Gaussian Channels, G. David Forney, Jr., and Gottfried Ungerboeck, IEEE Transactions of Information Theory, vol. 44, No. 6, Oct. 1998 pp. 2384-2415 (32 pages).

Intuitive Guide to Principles of Communications, www.complextoreal.com, Inter Symbol Interference (ISI) and Root-raised Cosine (RRC) filtering, (2002), pp. 1-23 (23 pages).

(56) References Cited

OTHER PUBLICATIONS

Chan, N., "Partial Response Signaling with a Maximum Likelihood Sequence Estimation Receiver" (1980). Open Access Dissertations and Theses. Paper 2855, (123 pages).

The Viterbi Algorithm, Ryan, M.S. and Nudd, G.R., Department of Computer Science, Univ. of Warwick, Coventry, (1993) (17 pages).

R. A. Gibby and J. W. Smith, "Some extensions of Nyquist's telegraph transmission theory," Bell Syst. Tech. J., vol. 44, pp. 1487-1510, Sep. 1965.

J. E. Mazo and H. J. Landau, "On the minimum distance problem for faster-than-Nyquist signaling," IEEE Trans. Inform. Theory, vol. 34, pp. 1420-1427, Nov. 1988.

D. Hajela, "On computing the minimum distance for faster than Nyquist signaling," IEEE Trans. Inform. Theory, vol. 36, pp. 289-295, Mar. 1990.

G. Ungerboeck, "Adaptive maximum-likelihood receiver for carrier modulated data-transmission systems," IEEE Trans. Commun., vol. 22, No. 5, pp. 624-636, May 1974.

G. D. Forney, Jr., "Maximum-likelihood sequence estimation of digital sequences in the presence of intersymbol interference," IEEE Trans. Inform. Theory, vol. 18, No. 2, pp. 363-378, May 1972.

A. Duel-Hallen and C. Heegard, "Delayed decision-feedback sequence estimation," IEEE Trans. Commun., vol. 37, pp. 428-436, May 1989.

M. V. Eyubog •lu and S. U. Qureshi, "Reduced-state sequence estimation with set partitioning and decision feedback," IEEE Trans. Commun., vol. 36, pp. 13-20, Jan. 1988.

W. H. Gerstacker, F. Obernosterer, R. Meyer, and J. B. Huber, "An efficient method for prefilter computation for reduced-state equalization," Proc. of the 11th IEEE Int. Symp. Personal, Indoor and Mobile Radio Commun. PIMRC, vol. 1, pp. 604-609, London, UK, Sep. 18-21, 2000.

W. H. Gerstacker, F. Obernosterer, R. Meyer, and J. B. Huber, "On prefilter computation for reduced-state equalization," IEEE Trans. Wireless Commun., vol. 1, No. 4, pp. 793-800, Oct. 2002.

Joachim Hagenauer and Peter Hoeher, "A Viterbi algorithm with soft-decision outputs and its applications," in Proc. IEEE Global Telecommunications Conference 1989, Dallas, Texas, pp. 1680-1686,Nov. 1989.

S. Mita, M. Izumita, N. Doi, and Y. Eto, "Automatic equalizer for digital magnetic recording systems" IEEE Trans. Magn., vol. 25, pp. 3672-3674, 1987.

E. Biglieri, E. Chiaberto, G. P. Maccone, and E. Viterbo, "Compensation of nonlinearities in high-density magnetic recording channels," IEEE Trans. Magn., vol. 30, pp. 5079-5086, Nov. 1994.

W. E. Ryan and A. Gutierrez, "Performance of adaptive Volterra equalizers on nonlinear magnetic recording channels," IEEE Trans. Magn., vol. 31, pp. 3054-3056, Nov. 1995.

X. Che, "Nonlinearity measurements and write precompensation studies for a PRML recording channel," IEEE Trans. Magn., vol. 31, pp. 3021-3026, Nov. 1995.

O. E. Agazzi and N. Sheshadri, "On the use of tentative decisions to cancel intersymbol interference and nonlinear distortion (with application to magnetic recording channels)," IEEE Trans. Inform. Theory, vol. 43, pp. 394-408, Mar. 1997.

Miao, George J., Signal Processing for Digital Communications, 2006, Artech House, pp. 375-377.

Xiong, Fuqin. Digital Modulation Techniques, Artech House, 2006, Chapter 9, pp. 447-483.

Faulkner, Michael, "Low-Complex ICI Cancellation for Improving Doppler Performance in OFDM Systems", Center for Telecommunication and Microelectronics, 1-4244-0063-5/06/$2000 (c) 2006 IEEE. (5 pgs).

Stefano Tomasin, et al. "Iterative Interference Cancellation and Channel Estimation for Mobile OFDM", IEEE Transactions on Wireless Communications, vol. 4, No. 1, Jan. 2005, pp. 238-245.

Int'l Search Report and Written Opinion for PCT/IB2013/01866 dated Mar. 21, 2014.

Int'l Search Report and Written Opinion for PCT/IB2013/001923 dated Mar. 21, 2014.

Int'l Search Report and Written Opinion for PCT/IB2013/001878 dated Mar. 21, 2014.

Int'l Search Report and Written Opinion for PCT/IB2013/002383 dated Mar. 21, 2014.

Int'l Search Report and Written Opinion for PCT/IB2013/01860 dated Mar. 21, 2014.

Int'l Search Report and Written Opinion for PCT/IB2013/01970 dated Mar. 27, 2014.

Int'l Search Report and Written Opinion for PCT/IB2013/01930 dated May 15, 2014.

Int'l Search Report and Written Opinion for PCT/IB2013/02081 dated May 22, 2014.

\* cited by examiner

US 8,891,701 B1

NONLINEARITY COMPENSATION FOR RECEPTION OF OFDM SIGNALS

INCORPORATION BY REFERENCE

The entirety of United States Patent Application Publication US2013/0343473 titled "Highly-Spectrally-Efficient Transmission Using Orthogonal Frequency Division Multiplexing" is hereby incorporated herein by reference.

BACKGROUND

Limitations and disadvantages of conventional approaches to reception of signals in the presence of nonlinear distortion will become apparent to one of skill in the art, through comparison of such approaches with some aspects of the present method and system set forth in the remainder of this disclosure with reference to the drawings.

BRIEF SUMMARY

Methods and systems are provided for nonlinearity compensation for reception of OFDM signals, substantially as illustrated by and/or described in connection with at least one of the figures, as set forth more completely in the claims.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
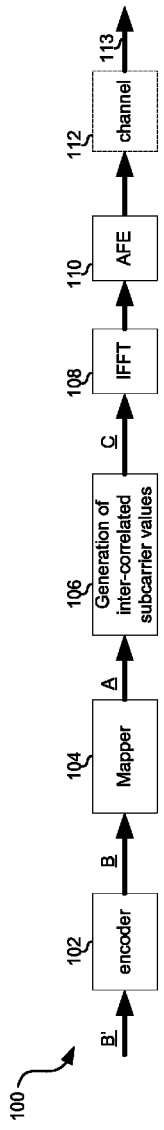
FIG. 1 shows an example transmitter operable to generate inter-carrier correlated (ICI) orthogonal frequency divisions multiplexed (OFDM) signals.

FIG. 1 shows an example transmitter operable to generate inter-carrier correlated (ICI) orthogonal frequency divisions multiplexed (OFDM) signals. Shown is a transmitter that comprises encoder circuitry 102, mapper circuitry 104, inter-subcarrier interference (ICI) generation circuitry 106, inverse fast Fourier transform (IFFT) circuit 108, and analog front end (AFE) 110.

The encoder circuitry 102 receives a vector of bits B' which are the bits of a particular OFDM symbol. The encoder circuitry 102 converts the bits B', to a vector of bits B, in accordance with a forward error correction (FEC) algorithm (e.g., Reed-Solomon, Low-Density Parity Check, Turbo, and/or the like).

The mapper circuit 104, is operable to map the vector B to a vector A according to a selected modulation scheme. For example, for a quadrature amplitude modulation (QAM) scheme having an alphabet size of M (M-QAM), the mapper may map each $Log_2(M)$ bits of B to a value represented as a complex number and/or as in-phase (I) and quadrature-phase (Q) components. Although M-QAM is used for illustration in this disclosure, aspects of this disclosure are applicable to any modulation scheme (e.g., pulse amplitude modulation (PAM), amplitude shift keying (ASK), phase shift keying (PSK), frequency shift keying (FSK), etc.). Additionally, points of the M-QAM constellation may be regularly spaced ("on-grid") or irregularly spaced ("off-grid"). Furthermore, the constellation used by the mapper 104 may be optimized for best bit-error rate (BER) performance (or adjusted to achieve a target BER) that is related to log-likelihood ratio (LLR) and to optimizing mean mutual information bit (MMIB) (or achieving a target MMIB).

The ISC generation circuitry 106 is operable to process A to generate a vector C. The elements of A are referred to herein as "virtual subcarrier values" of the particular OFDM symbol and the elements of C are referred to herein as the corresponding "physical subcarrier values" of the particular OFDM symbol, where: the vector A comprises N values, the vector C comprises P values, N and P are positive integers, N≥2, and N≥P. The N elements of A are represented herein as $a_1:a_N$, with any particular one of the values represented as $a_n$. The P elements of C are represented herein as $c_1:c_P$, with any particular one of the values represented as $c_p$. In an example implementation, the processing performed by the circuitry 106 may comprise cyclic filtering and/or decimation such that each of the ISC values of C depends on a plurality (perhaps all) of the elements of A. In an example implementation, the circuitry 106 may be similar to, or the same as, circuits 104 and 106 of the above incorporated Unites States Patent Application Publication US2013/0343473. In an example implementation, Δ (an integer) pilot symbols may be inserted at the IFFT and the total number of physical subcarriers may be P+Δ, where P is thus the quantity of data-carrying subcarriers.

The inverse fast Fourier transform (IFFT) circuit 108 is operable to convert the physical subcarrier value vector C (of length P) to a corresponding vector of P time-domain samples (i.e., the time-domain representation of the particular OFDM symbol).

The analog front end (AFE) 110 is operable to convert the P time-domain values output by IFFT 108 to an analog representation, upconvert the resulting analog signal, and amplify the upconverted signal for transmission onto a channel 112. Thus, the transmitter front-end 118 may comprise, for example, a digital-to-analog converter (DAC), mixer, and/or power amplifier. The front-end 118 may introduce nonlinear distortion and/or phase noise (and/or other non-idealities) to the transmitted signal 117. The nonlinear distortion introduced by the circuit 118 may be represented as $NL_{Tx}$ which may be, for example, a polynomial, or an exponential (e.g., Rapp model). The model of the nonlinear distortion may incorporate memory (e.g., Volterra series). The transmitted values C, after being converted to the time domain, experiencing the nonlinear distortion introduced by the AFE 110, and passing through the channel 112 (which may also introduce nonlinear distortion and/or noise), emerge as a signal 113.

Figure 2:
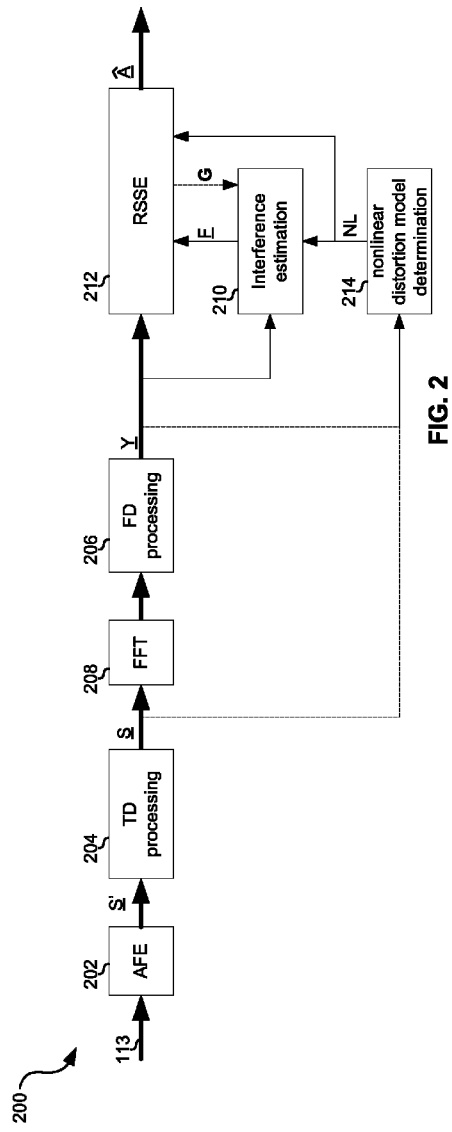
FIG. 2 shows an example receiver operable to recover information from received ICI OFDM signals.

FIG. 2 shows an example receiver operable to recover information from received ICI OFDM signals. The receiver comprises an analog front-end 202, time domain preprocessing circuitry 204, a fast Fourier transform (FFT) circuit 208, frequency domain preprocessing circuitry 206, nonlinear distortion model determination circuitry 214, interference estimation circuitry 210, and reduced state sequence estimation (RSSE) circuitry 212.

The AFE 202 is operable to process the signal 113 corresponding to a particular OFDM signal to a vector of S' samples of the particular OFDM symbol. Such processing may comprise, amplification, downconversion (to IF or baseband), and analog-to-digital conversion. Thus, the receiver front-end 202 may comprise, for example, a low-noise amplifier, a mixer, and/or an analog-to-digital converter. The AFE 202 may, for example, sample the received signal 113 P times per OFDM symbol period resulting in a S' of length P (where pilot symbols are used, the AFE 202 may sample P+Δ times per OFDM symbol). Due to non-idealities, the receiver front-end 202 may introduce nonlinear distortion and/or phase noise to the signal S'. The nonlinear distortion introduced by the front end 202 may be represented as $NL_{Rx}$ which may be, for example, a polynomial, or an exponential (e.g., Rapp model). The model of the nonlinear distortion may incorporate memory (e.g., Volterra series).

The time domain preprocessing circuitry 204 is operable to perform time-domain processing of the samples S' to generate received physical subcarrier value vector S. Such processing may include, for example, timing acquisition, phase correction, frequency correction, decimation, DC removal, IQ mismatch correction, filtering, windowing, removal of pilot symbols, cyclic prefix removal, and/or the like.

The FFT 208 is operable to convert the time-domain physical subcarrier value vector S (of length P) to a corresponding vector of P frequency-domain samples (i.e., convert the time-domain representation of S to the frequency-domain representation of S).

The frequency domain preprocessing circuitry 206 is operable to perform frequency domain processing of the output of the FFT 208 to generate a vector Y, which is a vector of N received virtual subcarrier values. Such processing may include, for example, performing the inverse of the ICI generation circuitry 106 (FIG. 1), and performing per-subcarrier equalization. The elements of Y are represented herein as $y_1:y_N$, with any particular one of the values represented as $y_n$.

The RSSE circuitry 212 is operable to perform reduced state sequence estimation on the vector Y to generate a vector Â which is the receiver's decision vector ("best guess" as to the transmitted virtual subcarrier value vector A). Details of an example implementation of RSSE circuitry 212 are described below with reference to FIG. 3.

The nonlinear distortion model determination circuitry 214 is operable to determine a model, NL, that represents/enables reproduction of (to a desired accuracy) the nonlinear distortion experienced by the signal S' in the transmitter, the channel, and/or the receiver. In an example implementation, the nonlinear distortion introduced by the AFE 110 of the transmitter may be dominant and NL may be a representation of $NL_{Tx}$. The nonlinear distortion model, NL, may be, for example, a logical and/or mathematical expression, a look-up table, and/or any other suitable representation of the nonlinear distortion. Any one or more of a variety of model types may be used for NL, with each model type being characterized by one or more parameters. The model type and/or parameter values may be communicated directly by the transmitter (e.g., during handshaking) and/or may be learned by the receiver by processing signals received from the transmitter (e.g., selection of the model type and/or training of the parameter values may be based on preambles sent by the transmitter). In an example implementation, NL may comprise an AM/AM parameter whose value is dependent on transmitted signal strength, and an AM/PM parameter whose value is dependent on transmitted signal strength. In such an example implementation, received signal strength may be used as a proxy for transmitted signal strength and the received signal strength may be applied to the look-up table to determine appropriate values of the AM/AM and AM/PM parameters.

The interference estimation circuitry 210 is operable to estimate the interference, F, present in the received virtual subcarrier values Y, based on Y and based on NL. Details of example implementations of 210 are described below with reference to FIGS. 5 and 6.

Figure 3:
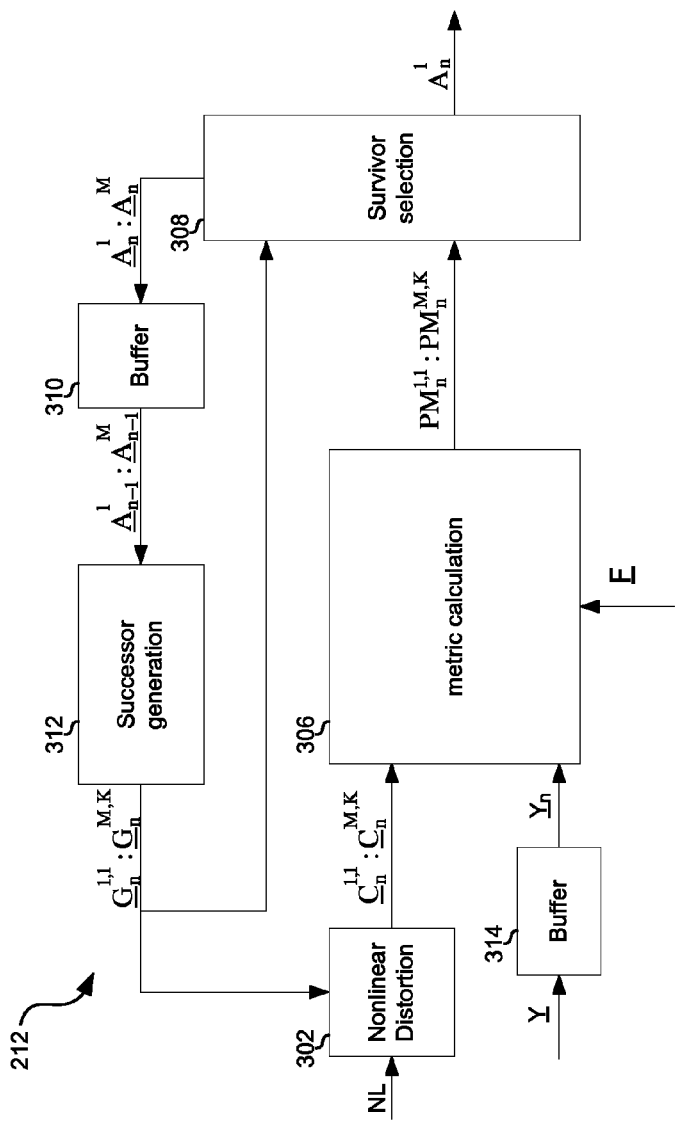
FIG. 3 shows an example implementation of the reduced state sequence estimation (RSSE) circuitry of FIG. 2.

FIG. 3 shows an example implementation of the reduced state sequence estimation (RSSE) circuitry of FIG. 2. The example RSSE circuitry 212 shown in FIG. 3 comprises nonlinear distortion circuitry 302, metric calculation circuitry 306, survivor selection circuitry 308, buffering circuitry 310, successor generation circuitry 312, and buffering circuitry 314. FIG. 2 depicts the RSSE circuitry 212 processing received virtual subcarrier value having index n (where $1 \leq n \leq N$) of a particular OFDM symbol.

The buffer circuitry 310 is operable to, upon completion of processing a particular received virtual subcarrier value of the OFDM symbol being processed, latch the selected survivor vectors such that those survivors are available for processing the next received virtual subcarrier value of the OFDM symbol. Thus, in FIG. 3, which shows processing of received virtual subcarrier value having index n, the survivors selected upon completion of processing the received virtual subcarrier value having index n−1 ($\hat{A}_{n-1}^1:\hat{A}_{n-1}^M$) are latched by the buffer 310 and output to the successor generation circuitry 312. Each survivor $\hat{A}_{n-1}^m$ comprises up to n elements corresponding to one or more of subcarriers 0 through n−1. Elements of survivor $\hat{A}_{n-1}^m$ are represented herein as $\hat{a}_0^m:\hat{a}_D^m$, where D is the memory depth of the RSSE circuitry.

The successor generation circuitry 312 is operable to extend each of the M survivors from the previous iteration, $\hat{A}_{n-1}^m$, to K successors, resulting in successors $\hat{G}=\hat{G}_n^{1,1}:\hat{G}_n^{M,K}$. Elements of successor vector $\hat{g}_n^{m,k}$ are represented herein as $\hat{g}_0^{m,k}:\hat{g}_D^{m,k}$, where $\hat{g}_0^{m,k}$ 1 is the element by which survivor $\hat{A}_{n-1}^m$ was extended to create successor $\hat{G}_n^{m,k}$. The number of successors generated thus depends on the number of survivors, M, retained for each received virtual subcarrier value and the number of possible symbol transmitted virtual subcarrier values for which it is desired to search. Higher values of M and K may achieve improved results at the expense of increased size and complexity. In an example implementation, the value of K may be chosen to be the size of the constellation used by mapper 104 (FIG. 1) (e.g., for 64QAM K may be set to 64) such that each survivor is extended by each possible transmitted virtual subcarrier value.

The nonlinear distortion circuitry 302 is operable to, for each of the M×K successors $\hat{\underline{G}}_n^{m,k}$, generate a candidate vector $\hat{C}_n^{m,k}$ introducing introducing nonlinear distortion to the successor $\hat{\underline{G}}_n^{m,k}$. Elements of candidate vector $C_n^{m,k}$ are represented herein as $\hat{c}_0^{m,k}:\hat{C}_D^{m,k}$, where $\hat{c}_0^{m,k}$ is the estimated constellation symbol of the (m,k) candidate for subcarrier index n, $\hat{c}_1^{m,k}$ is the estimated constellation symbol of the (m,k) candidate for subcarrier index n−1, and so on (where n is less than D, D-n elements may be values from an initialization of the RSSE circuitry).

Figure 4A:
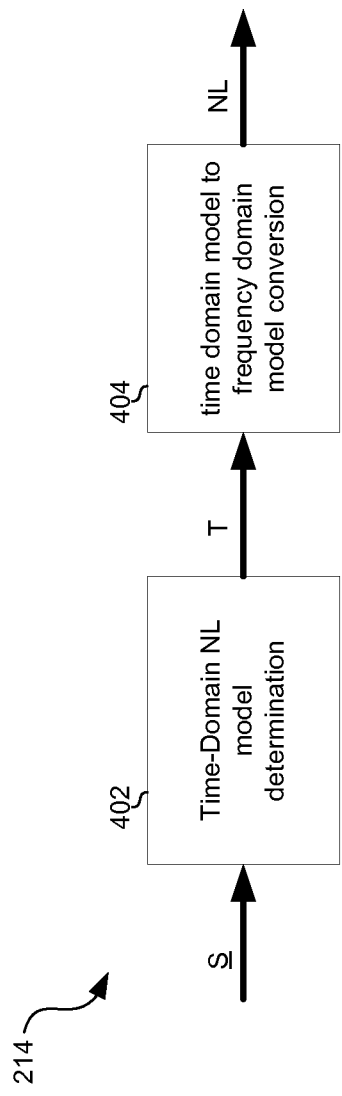
FIG. 4A shows a first example implementation of the nonlinear distortion model determination circuitry of FIG. 2.
Figure 4B:
FIG. 4B shows a second example implementation of the nonlinear distortion model determination circuitry of FIG. 2.

The nonlinear distortion introduced to each successor is determined based on NL from the nonlinear distortion model determination circuitry 214 (FIGS. 1, 4A, and 4B). In this manner, the circuitry 302 attempts to reproduce (to desired/necessary accuracy) the nonlinear distortion experienced by the signal 113 (or S' where nonlinear distortion of the AFE 202 is accounted for in NL)).

The metric calculation circuitry 306 is operable to calculate branch a path metric, $PM_n^{m,k}$ for each of the candidates $\hat{C}_n^{1,1}:\hat{C}_n^{M,K}$, and output the path metrics to the survivor selection circuitry 308. The path metric for candidate $\hat{C}_n^{m,k}$ may be calculated as $PM_n^{m,k}=BM_n^{m,k}+PM_{n-1}^{m,k}$, where $BM_n^{m,k}$ is the branch metric for candidate $\hat{C}_n^{m,k}$. The branch metric for candidate $\hat{C}_n^{m,k}$ may be calculated based on F. The manner in which the branch metric is calculated varies for different implementations. Some example branch metric calculations are described below with reference to FIGS. 5, 6, 7B, 7C, and 7D.

The survivor selection circuitry 308 is operable to compare the path metrics for each of the candidates $\hat{C}_n^{1,1}:\hat{C}_n^{M,K}$ (and select the M best candidates (corresponding to the M best path metrics) as the survivors $\hat{A}_n^1:\hat{A}_n^M$.

The buffer circuitry 314 is operable to buffer samples of signal Y and/or initialization samples and may shift the samples out as signal $Y_n$. For example, the first n elements of $Y_n$ may be equal to the first n elements of Y and the remaining (D−n) elements of $Y_n$ may be known values used for initialization of the RSSE circuitry.

FIG. 4A shows a first example implementation of the nonlinear distortion model determination circuitry of FIG. 2. The example implementation of nonlinear distortion model determination circuitry 214 shown in FIG. 4A comprises circuitry 402 operable to estimate the nonlinear distortion experienced by S (the output of time-domain processing circuitry 204 in FIG. 2) in the time domain. The estimation of the nonlinear distortion may be based on, for example, preambles present in S', the received signal strength of 113, and/or based on control information (e.g., a model type best suited for the transmitter from which signal 113 originated, initial nonlinear distortion model parameters, power level at signal 113 was transmitted, and/or the like) communicated to the receiver (e.g., during handshaking and/or in frame headers of S). Once the time domain nonlinear distortion model, T, has been determined, it is passed to circuitry 404 which translates it to the frequency domain representation, NL. The frequency domain representation NL is then output by the circuitry 214.

FIG. 4B shows a second example implementation of the nonlinear distortion model determination circuitry of FIG. 2. In the example implementation of FIG. 4B, the frequency domain NL is determined in the frequency domain directly from Y.

Figure 5:
FIG. 5 shows a first example implementation of the interference estimation circuitry of FIG. 2 for use with a generalized third-order nonlinear distortion model.

FIG. 5 shows a first example implementation of the interference estimation circuitry of FIG. 2 for use with a generalized third-order nonlinear distortion model. The example implementation of the interference estimation circuitry 210 in FIG. 5 comprises interference calculation circuitry 502.

The notation $f_n^{m,k}$ represents an estimate of the aggregate interference present in the received virtual subcarrier value having index n for candidate $\hat{C}_n^{m,k}$. The aggregate interference estimate may, for example, be a complex number representing the magnitude and phase of the interference. The notation F represents the vector (of length M×K) of aggregate interference estimates for all of the candidates $\hat{C}_n^{1,1}:\hat{C}_n^{M,K}$ (i.e., $F=f_n^{1,1}:f_n^{M,K}$). In some instances, the estimated aggregate interference may depend only on n (the received virtual subcarrier index) and may be the same for all of the candidates $\hat{C}_n^{1,1}:\hat{C}_n^{M,K}$ (i.e., each of the estimates $f_n^{1,1}:f_n^{M,K}$ (takes on the same value), but in other instances, the interference estimates may differ among the candidates $\hat{C}_n^{1,1}:\hat{C}_n^{M,K}$.

In a first variation, the aggregate interference estimate for candidate $\hat{C}_n^{m,k}$ may be calculated exhaustively taking into account each of the other N−1 virtual subcarriers. This exhaustive calculation may comprise calculating $f_n^{m,k}=\alpha\Sigma_{i=0}^{N-1}\Sigma_{j=0}^{N-1}z_i \cdot z_j^* \cdot z_{n-i+j}$, where: α is a parameter (or vector of parameters) determined by nonlinear model determination block 208, $z_i=y_i$ for i≥n; $z_i=g_i^{m,k}$ for i<n; $z_j=y_j$ for j≥n, $z_j=g_j^{m,k}$ for j<n, $y_i$ is a received virtual subcarrier value for subcarrier having index i, $y_j$ is the received virtual subcarrier value for subcarrier having index j, $g_i^{m,k}$ is the decision for the subcarrier having index i for the (m,k) candidate, where $g_j^{m,k}$ is the decision the subcarrier having index j for the (m,k) candidate.

In a second variation, the aggregate interference estimate for candidate $\hat{C}_n^{m,k}$ may be calculated taking into account only a selected subset of the other N−1 virtual subcarriers. This may reduce the amount of calculations necessary. This selective calculation may comprise calculating $f_n^{m,k}=\alpha\Sigma_{i\in Q}\Sigma_{j\in Q}z_i \cdot z_j^* \cdot z_{n-i+j}$, where α is a parameter (or vector of parameters) determined by nonlinear model determination block 208, Q is a subset of the set 1:N; $z_x=y_x$ for x≥n, $z_x=g_x^{m,k}$ for x<n, and x is used as a generic for i and j. For example, only indexes of virtual subcarriers having power above a determined threshold may be included in the set Q (based on the assumption that low-energy virtual subcarriers will experience relatively little nonlinear distortion and thus not contribute a lot of interference). The smaller the size of Q relative to the size of N, the more this selective calculation will reduce computational complexity/overhead.

Thus, common to both variations above is that, when calculating the interference present in received virtual subcarrier having index n due to another virtual subcarrier having index x for candidate $\hat{C}_n^{m,k}$, if a decision as to a transmitted virtual subcarrier having index x has already been generated by the RSSE circuitry (i.e., x<n), then the decided value of x (i.e., $g_x^{m,k}$) is used in the calculation, but if a decision as to a transmitted virtual subcarrier having index x has not yet been generated by the RSSE circuitry (i.e., x>n), then the received virtual subcarrier value having index x (i.e., $y_x$) is used for the calculation (based on the assumption that the interference in that received signal is relatively small compared to the desired signal and, therefore, error introduced is tolerable).

Once the estimated aggregate interference $f_n^{m,k}$ has been determined, the branch metric (represented as $BM_n^{m,k}$) for candidate $\hat{C}_n^{m,k}$ may be calculated. In an example implementation, the following expression may be used: $BM_n^{m,k}=|y_n-\hat{c}_0^{m,k}-f_n^{m,k}|^2$.

Figure 6:
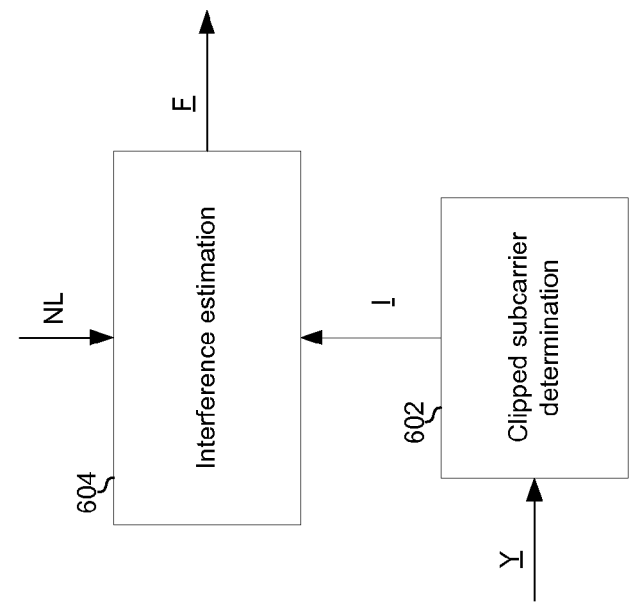
FIG. 6 shows a first example implementation of the interference estimation circuitry of FIG. 2 for use with a digital clipping nonlinear distortion model.

FIG. 6 shows a first example implementation of the interference estimation circuitry of FIG. 2 for use with a digital clipping nonlinear distortion model. In FIG. 6, the interference estimation circuitry 210 comprises clipped subcarrier determination circuit 602 and interference estimation circuit 604.

The clipped subcarrier determination circuit 602 is operable to determine which transmitted virtual subcarriers values were digitally clipped in the transmitter during the transmission that resulted in signal 113. The circuit 602 then outputs the indexes of the clipped subcarriers to the circuit 604 as vector I. In an example implementation, the transmitter may directly send such information (e.g., in a header) and the circuit 602 may simply extract the information. In another example implementation, the circuit 602 may determine which transmitted virtual subcarrier values were digitally clipped based on the magnitude of the received virtual subcarrier values.

With a digital clipping model, the interference F may be determined by NL and I. Thus, once the circuitry 604 has been provided NL and I for a particular OFDM symbol, calculation of F may be straightforward (with much less computational complexity/overhead than for the implementation described with reference to FIG. 5). Once F is determined, the branch metric for candidate $\hat{C}_n^{m,k}$ may be calculated. The calculation of the interference may be simplified as compared to the calculation described with reference to FIG. 5. In an example implementation, it may be calculated using the following expression: $BM_n^{m,k} = |y_n - \hat{c}_0^{m,k} - f_n|^2$, which is substantially similar to the branch metric expression presented above with reference to FIG. 5 but with the m and k superscripts left off of the interference term to indicate that the estimated aggregate interference present in the received virtual subcarrier having index n is the same for all candidates.

Figure 7A:
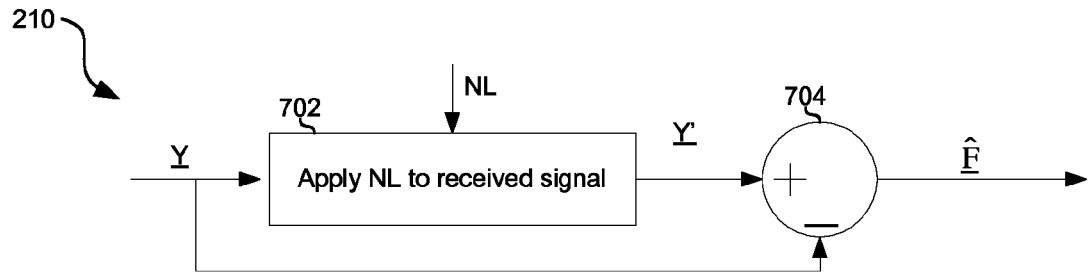
FIGS. 7A-7D show an example implementation in which the receiver of FIG. 2 performs two or more iterations over the subcarriers of an OFDM symbol to recover the data of the OFDM symbol in the presence of nonlinear distortion.

FIGS. 7A-7D show an example implementation in which the receiver of FIG. 2 performs two or more iterations over the OFDM symbol to generate decisions as to the transmitted virtual subcarrier values of the OFDM symbol in the presence of nonlinear distortion. Shown in FIG. 7A is another example implementation of interference estimation circuitry 210, which comprises nonlinear distortion circuitry 702 and combiner 704.

The nonlinear distortion circuitry 702 is operable to introduce nonlinear distortion to the received virtual subcarrier vector Y to generate Y'. The nonlinear distortion introduced is determined based on NL from the nonlinear distortion model determination circuitry 214 (FIGS. 1, 4A, and 4B). In this manner, the circuitry 702 attempts to reproduce (to desired/necessary accuracy) the nonlinear distortion experienced by the signal 113 (or the signal S' where nonlinear distortion of the AFE 202 is accounted for in NL).

The combiner 704 combines Y and Y' such that the output is the difference between Y and Y'. In this example implementation, the output of combiner 704 is $\hat{F}$—an initial approximation of the interference introduced by the nonlinear distortion experienced by Y. It is acknowledged that, because there is interference present in Y as a result of the nonlinear distortion that Y experienced en route to the circuitry 210 (at least a portion of which NL is attempting to model), this $\hat{F}$ is not going to be an exact measure of the actual interference present in Y. Nevertheless, if the strength of the interference present in Y is relatively small compared to the desired signal strength, the amount of additional interference contributed by the existing interference during application of NL may be small enough that $\hat{F}$ is a suitable approximation.

Figure 7B:
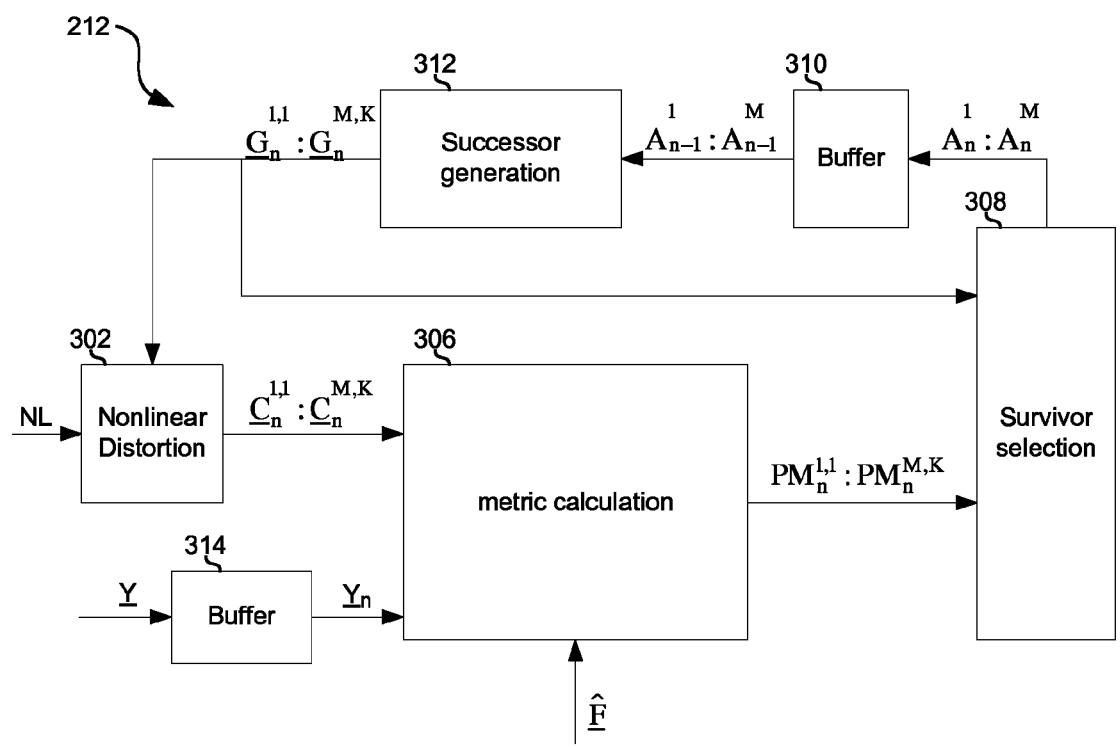

Once $\hat{F}$ is calculated as in FIG. 7A, a first iteration of processing the particular OFDM symbol is carried out by the RSSE circuitry 212 as shown in FIG. 7B. As is shown, during the first iteration on the particular OFDM symbol, $\hat{F}$ is input to the metric calculation circuitry 306, and the N subcarriers are processed sequentially. For each subcarrier n, the sequential processing during the first iteration on the particular OFDM symbol comprises: extending, by successor generation circuitry 312, each of the M selected survivors $$\left( \hat{\hat{A}}_{n-1}^1 : \hat{\hat{A}}_{n-1}^M \right)$$

from the previous subcarrier to K successors $$\left( \hat{\hat{G}}_n^{1,1} : \hat{\hat{G}}_n^{M,K} \right);$$

distorting, by nonlinear distortion circuitry 302, each of the M×K successors to generate candidates $$\hat{\underline{C}}_n^{1,1} : \hat{\underline{C}}_n^{M,K};$$

calculating, by metrics calculation circuitry 306, metrics for each candidate $$\hat{\underline{C}}_n^{m,k}$$

using $\hat{F}$; and selecting, by survivor selection circuitry 308, the M best survivors $$\hat{\hat{A}}_n^1 : \hat{\hat{A}}_n^M.$$

Thus, the metrics for candidate $$\hat{\underline{C}}_n^{m,k}$$

during the first iteration on the particular OFDM symbol are based on $$\hat{a}_0^1 : \hat{a}_{n-1}^M$$

and $y_{n+1}:y_N$ (as a iesuit of using $\hat{F}$). Upon completing processing of all N subcarriers, the M selected survivors are $$\hat{\hat{A}}_N^1 : \hat{\hat{A}}_N^M.$$

Figure 7C:
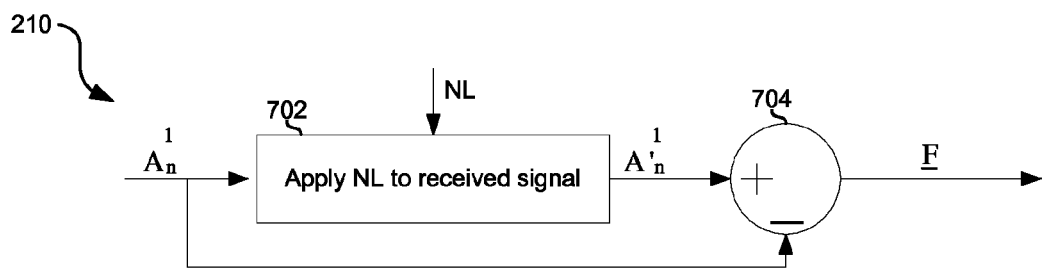
Figure 7D:
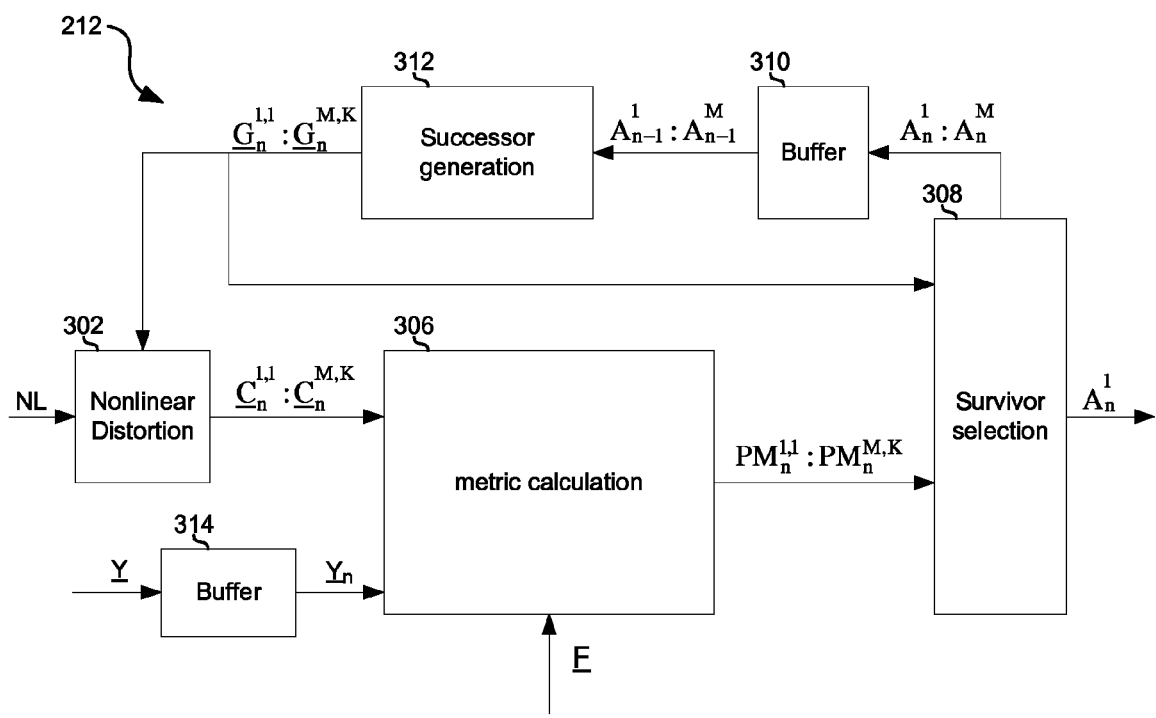

In some instances, the accuracy of these survivors may be improved via one or more additional iterations over the particular OFDM symbol. FIGS. 7C and 7D illustrate an embodiment where a second iteration is performed in an attempt to improve the reliability of the estimates.

As is shown, in FIG. 7C, for the second iteration on the particular OFDM symbol, $$\hat{a}_n^1$$

(rather than Y as was used in FIG. 7A) is used by circuitry 702 and 704 for calculating F, which, as shown in FIG. 7D, is then input to metric calculation circuitry 306 for calculating metrics during the second iteration on the particular OFDM symbol.

During the second iteration on the particular OFDM symbol, the successors are processed similarly to the first iteration. For each subcarrier n, the sequential processing during the second iteration on the particular OFDM symbol comprises: extending, by successor generation circuitry 312, each of the M selected survivors ($\hat{A}_{n-1}^1 : \hat{A}_{n-1}^M$) from the previous subcarrier to K successors ($\hat{G}_n^{1,1} : \hat{G}_n^{M,K}$); distorting, by nonlinear distortion circuitry 302, each of the M×K successors to generate candidates $\hat{C}_n^{1,1} : \hat{C}_n^{M,K}$; calculating, by metrics calculation circuitry 306, metrics for each candidate $\hat{C}_n^{m,k}$ using F̂; and selecting, by survivor selection circuitry 308, the M best survivors $\hat{A}_n^1 : \hat{A}_n^M$. Thus, the metrics for candidate $\hat{C}_n^{m,k}$ (during the first iteration on the particular OFDM symbol are based on $\hat{a}_0^1 : \hat{a}_{n-1}^M$ and $$\hat{a}_{n+1}^1 : \hat{a}_N^M$$

(as a result of using F). Upon completing processing of all N subcarriers, the M selected survivors are $\hat{A}_N^1 : \hat{A}_N^M$, and the best of these ($\hat{A}_N^1$) is selected for output to downstream circuitry such as a FEC decoder. In other implementations, additional iterations may be performed to refine these survivors even further.

In accordance with an example implementation of this disclosure, an electronic receiver (e.g., 200) may comprise nonlinear distortion modeling circuitry (e.g., 214), interference estimation circuitry (e.g., 210), and sequence estimation circuitry (e.g., 212). The receiver may receive an orthogonal frequency division multiplexing (OFDM) symbol in the form of an electromagnetic signal (e.g., 113). The nonlinear distortion modeling circuitry may generate a nonlinear distortion model (e.g., NL) that models nonlinear distortion introduced to the received electromagnetic signal en route to the sequence estimation circuitry. The interference estimation circuitry may estimate inter-subcarrier interference present in the received OFDM symbol based on the generated nonlinear distortion model. The sequence estimation circuitry may sequentially process a plurality of received virtual subcarrier values (e.g., Y) of the OFDM symbol using the estimated inter-subcarrier interference. The processing may result in decisions as to a plurality of transmitted virtual subcarrier values (e.g., $\hat{A}_n^1$) that correspond to the plurality of received virtual subcarrier values. The estimating of the inter-subcarrier interference may comprise applying the nonlinear distortion model to one or more candidate vectors (e.g., $\underline{G}_n^{m,k}$) generated by the sequence estimation circuitry. The estimating of the inter-subcarrier interference may comprise determining which one or more of the transmitted virtual subcarrier values were digitally clipped in a transmitter from which the received electromagnetic signal originated. The estimating of the inter-subcarrier interference may comprise calculating the inter-subcarrier interference based on which one or more of the plurality of transmitted virtual subcarrier values were digitally clipped in the transmitter and based on the generated nonlinear distortion model. The determining which one or more of the plurality of transmitted virtual subcarrier values were digitally clipped in the transmitter may comprise determining magnitude of each of the plurality of received virtual subcarrier values. The estimating of the inter-subcarrier interference may comprise applying the nonlinear distortion model to the received electromagnetic signal to generate an intermediate electromagnetic signal (e.g., Y'). The estimating of the inter-subcarrier interference may comprise subtracting the received electromagnetic signal from the intermediate electromagnetic signal, a result of the subtraction being the estimate of the inter-subcarrier interference. The plurality of received virtual subcarrier values may comprise a first received virtual subcarrier value (e.g., $y_0$) and a second received virtual subcarrier value (e.g., $y_1$). The sequential processing may comprise processing the first received virtual subcarrier value to generate a decision as to a first one of the plurality of transmitted virtual subcarrier values (e.g., $\hat{a}_0^1$) using an estimate of interference present in the first received virtual subcarrier value (e.g., $f_0$) that is based on the second received virtual subcarrier value. The sequential processing may comprise processing the second received virtual subcarrier value to generate a decision as to a second one of the plurality of transmitted virtual subcarrier values (e.g., $\hat{a}_1^1$) using an estimate of interference present in the second received virtual subcarrier value (e.g., $f_1$) that is based on the generated decision as to the first one of the plurality of transmitted virtual subcarrier values. The plurality of received virtual subcarrier values may comprise a third received virtual subcarrier value (e.g., $y_2$). The estimate of interference present in the second received virtual subcarrier value may be based on the third received virtual subcarrier value. The sequential processing may comprise processing the third received virtual subcarrier value to generate a decision as to a third one of the plurality of transmitted virtual subcarrier values (e.g., $\hat{a}_2^1$) using an estimate of interference present in the third received virtual subcarrier value (e.g., $f_3$) that is based on the generated decision as to the first one of the plurality of transmitted virtual subcarrier values and on the generated decision as to the second one of the plurality of transmitted virtual subcarrier values. The sequential processing may comprise generating a plurality of branch metrics (e.g., $BM_0^{1,1} : BM_{N-1}^{M,K}$), wherein each of the plurality of branch metrics is based on a corresponding one of the received virtual subcarrier values, a candidate vector generated by the sequence estimation circuitry, and the estimated inter-subcarrier interference. For each of the plurality of received virtual subcarrier values, the estimating of the inter-subcarrier interference may considers all others of the received virtual subcarrier values or only a subset of all others of the plurality of received virtual subcarrier values. The subset of all others of the plurality of received virtual subcarrier values may correspond to those of the plurality of received virtual subcarrier values having a magnitude above a determined threshold.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
    in an electronic receiver comprising nonlinear distortion modeling circuitry, interference estimation circuitry, and sequence estimation circuitry:
    receiving an orthogonal frequency division multiplexing (OFDM) symbol in the form of an electromagnetic signal;
    generating, in said nonlinear distortion modeling circuitry, a nonlinear distortion model that models nonlinear distortion introduced to said received electromagnetic signal en route to said sequence estimation circuitry;
    estimating, in said interference estimation circuitry, inter-subcarrier interference present in said received OFDM symbol based on said generated nonlinear distortion model; and
    sequentially processing, in said sequence estimation circuitry, a plurality of received virtual subcarrier values of said OFDM symbol using said estimated inter-subcarrier interference, said processing resulting in decisions as to a plurality of transmitted virtual subcarrier values that correspond to said plurality of received virtual subcarrier values.

2. The method of claim 1, wherein said estimating said inter-subcarrier interference comprises applying said nonlinear distortion model to one or more candidate vectors generated by said sequence estimation circuitry.

3. The method of claim 1, wherein said estimating said inter-subcarrier interference comprises:
    determining which one or more of said transmitted virtual subcarrier values were digitally clipped in a transmitter from which said received electromagnetic signal originated; and
    calculating said inter-subcarrier interference based on said which one or more of said plurality of transmitted virtual subcarrier values were digitally clipped in said transmitter and based on said generated nonlinear distortion model.

4. The method of claim 3, wherein said determining which one or more of said plurality of transmitted virtual subcarrier values were digitally clipped in said transmitter comprises: determining the magnitude of each of said plurality of received virtual subcarrier values.

5. The method of claim 1, wherein said estimating said inter-subcarrier interference comprises:
    applying said nonlinear distortion model to said received electromagnetic signal to generate an intermediate electromagnetic signal; and
    subtracting said received electromagnetic signal from said intermediate electromagnetic signal, a result of said subtractieng being said estimated of said inter-subcarrier interference.

6. The method of claim 1, wherein said plurality of received virtual subcarrier values comprises a first received virtual subcarrier value and a second received virtual subcarrier value, and said sequentially processing comprises:
    processing said first received virtual subcarrier value to generate a decision as to a first one of said plurality of transmitted virtual subcarrier values using an estimate of interference present in said first received virtual subcarrier value that is based on said second received virtual subcarrier value; and
    processing said second received virtual subcarrier value to generate a decision as to a second one of said plurality of transmitted virtual subcarrier values using an estimate of interference present in said second received virtual subcarrier value that is based on said generated decision as to said first one of said plurality of transmitted virtual subcarrier values.

7. The method of claim 6, wherein:
    said plurality of received virtual subcarrier values comprises a third received virtual subcarrier value;
    said estimate of interference present in said second received virtual subcarrier value is based on said third received virtual subcarrier value.

8. The method of claim 7, comprising:
    processing said third received virtual subcarrier value to generate a decision as to a third one of said plurality of transmitted virtual subcarrier values using an estimate of interference present in said third received virtual subcarrier value that is based on said generated decision as to said first one of said plurality of transmitted virtual subcarrier values and on said generated decision as to said second one of said plurality of transmitted virtual subcarrier values.

9. The method of claim 1, comprises:
    generating, during said sequentially processing said plurality of received virtual subcarrier values, a plurality of branch metrics, wherein each of said plurality of branch metrics is based on a corresponding one of said received virtual subcarrier values, a candidate vector generated by said sequence estimation circuitry, and said estimated inter-subcarrier interference.

10. The method of claim 1, wherein, for each of said plurality of received virtual subcarrier values, said estimating said inter-subcarrier interference considers all others of said received virtual subcarrier values.

11. The method of claim 1, wherein, for each of said plurality of received virtual subcarrier values, said estimating said inter-subcarrier interference considers only a subset of all others of said plurality of received virtual subcarrier values.

12. The method of claim 11, wherein said subset of all others of said plurality of received virtual subcarrier values corresponds to those of said plurality of received virtual subcarrier values having a magnitude above a determined threshold.

13. A system comprising:
an electronic receiver comprising nonlinear distortion modeling circuitry, interference estimation circuitry, and sequence estimation circuitry, wherein:
said nonlinear distortion modeling circuitry is operable to generate a nonlinear distortion model that models nonlinear distortion introduced to a received electromagnetic signal while said received electromagnetic signal was en route to said sequence estimation circuitry;
said interference estimation circuitry is operable to estimate inter-subcarrier interference present in said received OFDM symbol based on said generated nonlinear distortion model; and
said sequence estimation circuitry is operable to sequentially process a plurality of received virtual subcarrier values of said OFDM symbol using said estimated inter-subcarrier interference, said processing resulting in decisions as to a plurality of transmitted virtual subcarrier values that correspond to said plurality of received virtual subcarrier values.

14. The system of claim 13, wherein, as part of said estimation of said inter-subcarrier interference, said interference estimation circuitry is operable to apply said nonlinear distortion model to one or more candidate vectors generated by said sequence estimation circuitry.

15. The system of claim 13, wherein, as part of said estimation of said inter-subcarrier interference, said interference estimation circuitry is operable to:
determine which one or more of said transmitted virtual subcarrier values were digitally clipped in a transmitter from which said received electromagnetic signal originated; and
calculate said inter-subcarrier interference based on said which one or more of said plurality of transmitted virtual subcarrier values were digitally clipped in said transmitter and based on said generated nonlinear distortion model.

16. The system of claim 15, wherein said determination of which one or more of said plurality of transmitted virtual subcarrier values were digitally clipped in said transmitter comprises a determination of magnitude of each of said plurality of received virtual subcarrier values.

17. The system of claim 13, wherein, as part of said estimation of said inter-subcarrier interference, said interference estimation circuitry is operable to:
apply said nonlinear distortion model to said received electromagnetic signal to generate an intermediate electromagnetic signal; and
subtract said received electromagnetic signal from said intermediate electromagnetic signal, a result of said subtraction being said estimate of said inter-subcarrier interference.

18. The system of claim 13, wherein said plurality of received virtual subcarrier values comprises a first received virtual subcarrier value and a second received virtual subcarrier value, and, during said sequentially processing, said sequence estimation circuitry is operable to:
process said first received virtual subcarrier value to generate a decision as to a first one of said plurality of transmitted virtual subcarrier values using an estimate of interference present in said first received virtual subcarrier value that is based on said second received virtual subcarrier value; and
process said second received virtual subcarrier value to generate a decision as to a second one of said plurality of transmitted virtual subcarrier values using an estimate of interference present in said second received virtual subcarrier value that is based on said generated decision as to said first one of said plurality of transmitted virtual subcarrier values.

19. The system of claim 18, wherein:
said plurality of received virtual subcarrier values comprises a third received virtual subcarrier value;
said estimate of interference present in said second received virtual subcarrier value is based on said third received virtual subcarrier value.

20. The system of claim 19, wherein said sequence estimation circuitry is operable to:
process said third received virtual subcarrier value to generate a decision as to a third one of said plurality of transmitted virtual subcarrier values using an estimate of interference present in said third received virtual subcarrier value that is based on said generated decision as to said first one of said plurality of transmitted virtual subcarrier values and on said generated decision as to said second one of said plurality of transmitted virtual subcarrier values.

21. The system of claim 13, wherein:
as part of said sequentially processing said plurality of received virtual subcarrier values, said sequence estimation circuitry is operable generate a plurality of branch metrics; and
each of said plurality of branch metrics is based on a corresponding one of said received virtual subcarrier values, a candidate vector generated by said sequence estimation circuitry, and said estimated inter-subcarrier interference.

22. The system of claim 13, wherein, for each of said plurality of received virtual subcarrier values, said sequence estimation circuitry is operable to consider all others of said received virtual subcarrier values during said estimation of said inter-subcarrier interference.

23. The system of claim 13, wherein, for each of said plurality of received virtual subcarrier values, said sequence estimation circuitry is operable to consider only a subset of all others of said plurality of received virtual subcarrier values during said estimation of said inter-subcarrier interference.

24. The system of claim 23, wherein said subset of all others of said plurality of received virtual subcarrier values corresponds to those of said plurality of received virtual subcarrier values having a magnitude above a determined threshold.

25. The system of claim 13, comprising an electronic transmitter comprising a symbol mapper, an inter-carrier correlation generation circuit, and an inverse fast Fourier transform (IFFT) circuit, wherein:
said symbol mapper is operable to map groups of data bits to virtual subcarrier values;
said inter-carrier correlation generation circuit is operable to convert said virtual subcarrier values to physical subcarrier values; and
said IFFT circuit is operable to convert said physical subcarrier values to the time domain.

* * * * *